United States Patent
Chien et al.

(10) Patent No.: US 12,459,541 B2
(45) Date of Patent: Nov. 4, 2025

(54) METHOD OF DETECTING MOVING OBJECTS, DEVICE, ELECTRONIC DEVICE, AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 347 days.

(21) Appl. No.: 18/144,048

(22) Filed: May 5, 2023

(65) Prior Publication Data
US 2023/0391372 A1    Dec. 7, 2023

(30) Foreign Application Priority Data
Jun. 2, 2022  (CN) ......................... 202210624110.X

(51) Int. Cl.
| | |
|---|---|
| *B60W 60/00* | (2020.01) |
| *G06T 1/20* | (2006.01) |
| *G06T 1/60* | (2006.01) |
| *G06T 7/20* | (2017.01) |
| *G06T 7/70* | (2017.01) |
| *G06V 10/25* | (2022.01) |
| *G06V 10/42* | (2022.01) |

(52) U.S. Cl.
CPC ............ *B60W 60/0025* (2020.02); *G06T 1/20* (2013.01); *G06T 1/60* (2013.01); *G06T 7/20* (2013.01); *G06T 7/70* (2017.01); *G06V 10/25* (2022.01); *G06V 10/42* (2022.01)

(58) Field of Classification Search
CPC .................................. G06T 7/20; G06T 7/70
See application file for complete search history.

(56) References Cited

U.S. PATENT DOCUMENTS

| | | | |
|---|---|---|---|
| 2022/0300001 A1* | 9/2022 | Gayaka ................ | G05D 1/0088 |
| 2024/0028031 A1* | 1/2024 | Kentley-Klay ........ | B60Q 1/543 |
| 2024/0077617 A1* | 3/2024 | Lawson ................ | G01S 13/584 |
| 2024/0353851 A1* | 10/2024 | Lee ........................ | G05D 1/225 |

OTHER PUBLICATIONS

Gehrung, J. et al., "An Approach to Extract Moving Objects from Mls Data Using a Volumetric Background Representation", ISPRS Annals of the Photogrammetry, Remote Sensing and Spatial Information Sciences, IV-1/W1, 2017 pp. 107-114, May 30, 2017, https://doi.org/10.5194/isprsannals-IV-1-W1-107-2017.

* cited by examiner

*Primary Examiner* — Benjamin O Dulaney
(74) *Attorney, Agent, or Firm* — ScienBiziP, P.C.

(57) ABSTRACT

A method of detecting moving objects is provided. The method obtains point cloud data set of a target scene and an image of the target scene. The method detects one or more stationary object areas from the image. The method records point cloud data, which corresponds to the stationary object areas in the point cloud data set, to be first point cloud data. The method determines a velocity range of the first point cloud data according to the first point cloud data. The method further determines whether one or more moving objects are present in the target scene according to second point cloud data and the velocity range of the first point cloud data. The second point cloud data is the point cloud data of the point cloud data set excluding the first point cloud data. A related electronic device and a non-transitory storage medium are provided.

20 Claims, 6 Drawing Sheets

METHOD OF DETECTING MOVING OBJECTS, DEVICE, ELECTRONIC DEVICE, AND STORAGE MEDIUM

FIELD

The subject matter herein generally relates to a detection of moving object technology, and particularly to a method of detecting moving objects, a device, an electronic device, and a storage medium.

BACKGROUND

Automated driving system (automated driving system, ADS) technology is a process in which a sensing system senses information about a surrounding environment, makes decisions and plans a traveling path based on the information sensed by the sensing system, and controls, by the mobile object, the mobile object to complete driving autonomously based on the planned traveling path. For example, current automated driving technologies may be applied to an intelligent vehicle (smart/intelligent car). An onboard sensing system of the vehicle senses a road environment, and then a vehicle control system plans a traveling path, and controls itself to implement autonomous driving based on the planned traveling path.

In the above described autonomous driving process, an image can be employed to detect one or more moving objects on a travelling path section, and a future trajectory can be predicted according to the detected one or more moving objects, to perform an obstacle avoidance path planning. However, determining which objects are moving cannot be achieved by relying solely on the image. For example, an object in the image can be detected to be a vehicle, however whether the vehicle is moving cannot be determined solely on the image.

SUMMARY

An embodiment of the present application provides a method of detecting moving objects, a device, an electronic device, and a storage medium capable of improving an accuracy for detecting moving object by the point cloud data obtained by a radar.

In a first aspect, an embodiment of the present application provides a method of detecting moving objects. The method obtains a point cloud data set of a target scene and an image of the target scene. The method detects one or more stationary object areas from the image. The method records the point cloud data, which corresponds to the one or more stationary object areas in the point cloud data set, to be first point cloud data. The method determines a velocity range of the first point cloud data according to the first point cloud data. The method determines whether one or more moving objects are present in the target scene according to the second point cloud data and the velocity range of the first point cloud data. Wherein the second point cloud data is the point cloud data of the point cloud data set excluding the first point cloud data.

According to some embodiments of the present application, the method converts point cloud data of the point cloud data set into two-dimensional (2D) coordinates, and to obtain a 2D coordinates set corresponding to the point cloud data set. The method determines, for any one 2D coordinates in the 2D coordinates set, whether the 2D coordinates correspond to the stationary object area. If any one 2D coordinates in the 2D coordinates set is determined to correspond to the stationary object area, the method records the point cloud data corresponding to the 2D coordinates to be the first point cloud data.

According to some embodiments of the present application, the method obtains a range of coordinates of the one or more stationary object areas, wherein the one or more stationary object areas are one or more areas where a ground is. The method determines, for any one 2D coordinates in the 2D coordinates set, whether the 2D coordinates are within the range of the coordinates of the stationary object areas. The method further determines that the 2D coordinates correspond to the stationary object area if the 2D coordinates are within the range of the coordinates of the stationary object areas.

According to some embodiments of the present application, the method obtains a velocity of each of the first point cloud data, and determines the velocity range of the first point cloud data according to the velocity of each of the first point cloud data.

According to some embodiments of the present application, the method determines whether the velocities of the second point cloud data are within the velocity range of the first point cloud data. The method records one or more target objects corresponding to the second point cloud data to be the one or more moving objects if the velocities of the second point cloud data are within the velocity range of the first point cloud data, wherein the one or more target objects are one or more objects in the target scene.

According to some embodiments of the present application, the method determines one or more target pixels of the image according to the 2D coordinates corresponding to the second point cloud data, if the velocities of the second point cloud data are out of the velocity range of the first point cloud data. The method determines one or more areas where the one or more target pixels are to be one or more moving object areas.

According to some embodiments of the present application, the method obtains the point cloud data set of the target scene via a radar. The radar collects the point cloud data set of the target scene. The method obtains the image of the target scene via an imaging device. The imaging device captures the image of the target scene. Wherein the imaging device captures the image of the target scene and the radar collects the point cloud data set of the target scene simultaneously.

In a second aspect, an embodiment of the present application provides an electronic device. The electronic device includes a storage device and at least one processor. The storage device storing one or more programs, which when executed by the at least one processor, cause the at least one processor to: obtain a point cloud data set of a target scene and an image of the target scene, detect one or more stationary object areas from the image, record the point cloud data, which corresponds to the stationary object areas in the point cloud data set, to be first point cloud data, determine a velocity range of the first point cloud data according to the first point cloud data, and determine whether one or more moving objects are present in the target scene according to second point cloud data and the velocity range of the first point cloud data, wherein the second point cloud data is the point cloud data of the point cloud data set excluding the first point cloud data.

In a third aspect, an embodiment of the present application also provides a non-transitory storage medium. The non-transitory storage medium storing a set of commands, when the commands being executed by at least one processor of an electronic device, causing the at least one processor to: obtain a point cloud data set of a target scene and an image of the target scene, detect one or more stationary object areas from the image, record the point cloud data, which corresponds to the stationary object areas in the point cloud data set, to be first point cloud data, determine a velocity range of the first point cloud data according to the first point cloud data, and determine whether one or more moving objects are present in the target scene according to second point cloud data and the velocity range of the first point cloud data. Wherein the second point cloud data is the point cloud data of the point cloud data set excluding the first point cloud data.

The disclosure has the following beneficial effects:

A new manner for detecting moving object is provided. The disclosure can obtain the point cloud data set of the target scene and the image of the target scene which are collected and captured at the same time. The disclosure can detect one or more stationary object areas where the one or more stationary objects are and from the image via detecting the image. The method can determine the point cloud data of the one or more stationary object areas from the point cloud data set, namely determine the point cloud data of the one or more stationary objects from the point cloud data set. The method further records the point cloud data to be the first point cloud data. The method can determine the velocity range according to the velocities of the first point cloud data, thus the velocity range of the one or more stationary objects can be obtained. Thus, the method can determine a relationship between the velocities of the second point cloud data excluding the first point cloud data and the velocity range of the one or more stationary objects, namely determine a relationship between the one or more target objects corresponding to the second point cloud data and the one or more stationary objects. If the velocities of the second point cloud data are within the velocity range of the first point cloud data, the one or more target objects corresponding to the second point cloud data are stationary relative to the one or more stationary objects. If the velocities of the second point cloud data are out of the velocity range of the first point cloud data, the one or more target objects corresponding to the second point cloud data are moving relative to the one or more stationary objects. The ground is selected to be the one or more stationary objects, thus the one or more target objects which are moving relative to the ground are the one or more moving objects. The method can improve an accuracy for detecting moving object via the point cloud data obtained by the radar.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will therefore be appreciated that the embodiments may be modified within the scope of the claims.

It should be noted that, when an element is referred to as being "coupled to" another element, the element can be directly connected the other element or intervening elements may also be present. When an element is described as "arranged on" another element, the element can be directly arranged on the other element or intervening elements may also be present.

Unless otherwise defined, all technical and scientific terms used in this text have the same meaning as commonly understood by persons skilled in the art to which the present invention belongs. The terms used in the description of the present invention are for the purpose of describing the specific embodiments only, and are not intended to limit the present invention. The term "and/or" used in this text includes any and all combinations of one or more of the associated listed items.

Figure 1:
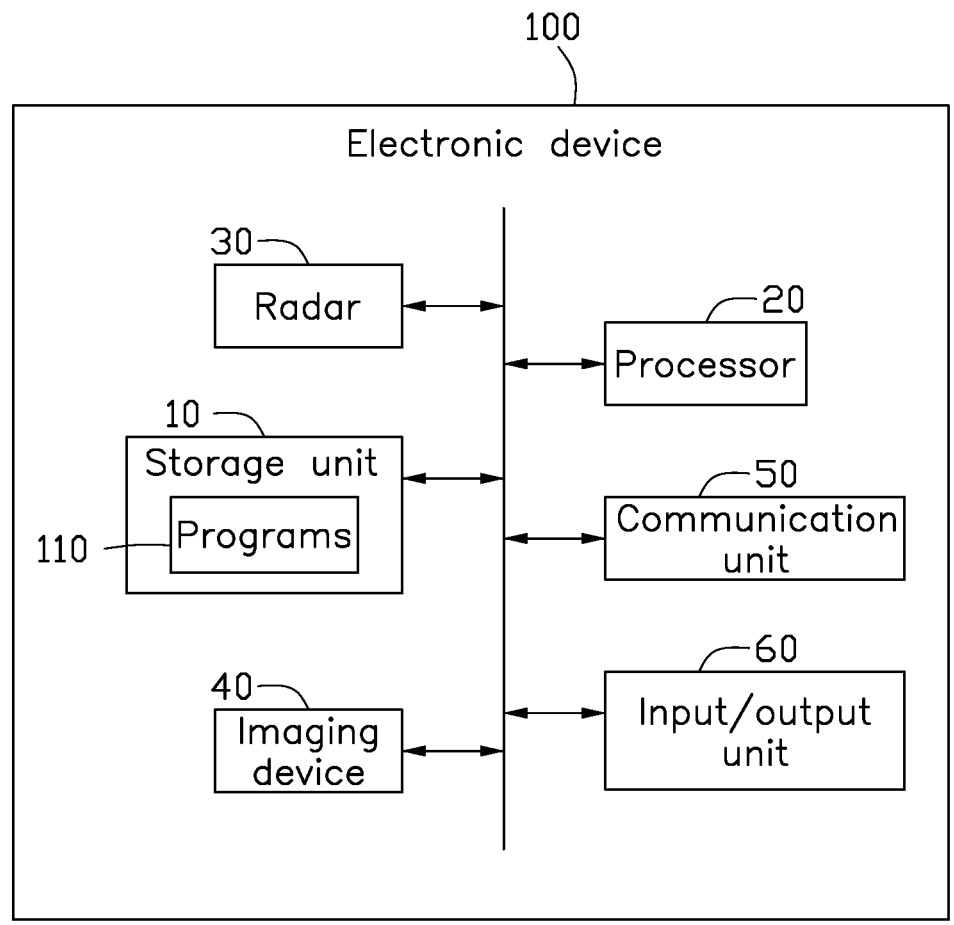
FIG. 1 is a block diagram of an embodiment of an electronic device.

Referring to FIG. 1, an electronic device 100 is shown. The electronic device 100 can include a storage unit 10, at least one processor 20, and one or more programs 110 stored in the storage unit 10 and can be run on the at least one processor 20. The one or more programs 110 can be a device of detecting moving objects 200 in FIG. 2. The at least one processor 20 can accomplish the steps of the exemplary method, for example the steps in FIGS. 3-6. The at least one processor 20 can execute the device of detecting moving objects to accomplish the steps of the exemplary method. Or, the at least one processor 20 can execute the device of detecting moving objects to accomplish the function of modules/units of the exemplary device, for example the modules/units 210~250 in the FIG. 2.

The device of detecting moving objects can be divided into one or more modules/units. The one or more modules/units can be stored in the storage unit 10 and executed by the at least one processor 20 to accomplish the object of the present disclosure. The one or more modules/units can be a series of program instruction segments which can perform specific functions, and the instruction segment is configured to describe the execution process of the device of detecting moving objects in the electronic device 100. For example, the device of detecting moving objects can be divided into an obtaining module 210, a detecting module 220, a recording module 230, a determining module 240, and a judging module 250 as shown in the FIG. 2. The detail function of the modules can refer to the functions of the following modules.

The at least one processor 20 can be one or more central processing units (CPU), or it can be one or more other universal processors, digital signal processors (DSP), application specific integrated circuits (ASIC), field-programmable gate arrays (FPGA), or other programmable logic devices, discrete gate or transistor logic, discrete hardware components, and so on. The at least one processor 20 can be a microprocessor or the at least one processor 20 can be any regular processor, or the like. The at least one processor 20 can be a control center of the electronic device 100, using a variety of interfaces and lines to connect various parts of the entire electronic device 100.

The storage unit 10 stores the one or more programs 110 and/or modules/units. The at least one processor 20 can run or execute the one or more programs 110 and/or modules/units stored in the storage unit 10, call out the data stored in the storage unit 10, and accomplish the various functions of the electronic device 100. The storage unit 10 can include high-speed random access memory and non-transitory storage medium, such as hard disk, memory, plug-in hard disk, smart media card, secure digital, flash card, at least one disk storage device, flash memory, or other transitory storage medium.

In one embodiment, the electronic device 100 further includes a radar 30. The radar 30 is a device capable of emitting electromagnetic waves to probe one or more objects in a target scene. The radar 30 can scan the target scene to collect a point cloud data set of the target scene. The point cloud data set includes a number of point cloud data. The point cloud data includes information, for example a distance between each object in the target scene and an electromagnetic wave emission point, a value of range rate (radial velocity), an azimuth, a height, a velocity, a movement direction, and so on. The radar 30 is coupled to the processor 20. The processor 20 can obtain the point cloud data set from the radar 30. The point cloud data is also referred to as laser point cloud data or 3D (three-dimensional) point cloud data, The point cloud data is a set of mass points for expressing the object spatial distribution and object surface characteristics of an object obtained by acquiring a spatial coordinate of each sampling point on the surface of the object in a certain spatial reference system using a laser. Comparing to an image, the point cloud data lacks detail texture information, but the point cloud data includes rich 3D spatial information, a distance between each object and the radar 30, and a velocity of each object.

More specifically, the radar 30 includes a transmitter and a receiver. The transmitter and the receiver are usually arranged at the same location of the electronic device 100. The transmitter transmits pulses of RF (Radio-frequency) waves that bounce off any object(s) in their path. The pulses reflected off the object(s) return a small part of the RF waves energy to the receiver. The receiver can receive the RF waves reflected off the object(s) in the target scene, namely collect the point cloud data related to the target scene. Thus, the radar 30 can collect the point cloud data set of the target scene.

The radar 30 can be an in-vehicle millimeter wave radar, a laser radar, an ultrasonic radar, and so on.

In one embodiment, the electronic device 100 further includes an imaging device 40. The imaging device 40 can be configured to capture the image of the target scene. The imaging device 40 is coupled to the processor 20. The processor 20 can obtain the image from the imaging device 40. The imaging device 40 also is referred to as a lens or a camera. If the electronic device 100 is a vehicle, the imaging device 40 can be a driving recorder.

In one embodiment, the electronic device 100 further includes a communication unit 50. The communication unit 50 is configured to establish a communication connection with the other computing devices via a wired manner or a wireless manner. The communication unit 50 can be a wired communication unit or a wireless communication unit.

In one embodiment, the electronic device 100 further includes an input/output unit 60. The input/output unit 60 can be a keyboard, a mouse, a display screen, and so on. The display screen is configured to display media files of the electronic device 100.

The electronic device 100 can be a device, for example an in-vehicle device, a vehicle (for example an automatic driving vehicle), a moving robot (for example a cleaning robot, a tour guide robot), a cloud server, or the like. A person skilled in the art may understand that, the shown structure imposes no limitation on the electronic device 100, and the electronic device 100 may include more or fewer components than those shown in the figure, for example including a network access device and a bus, or combine some components, or have different component arrangements.

Figure 2:
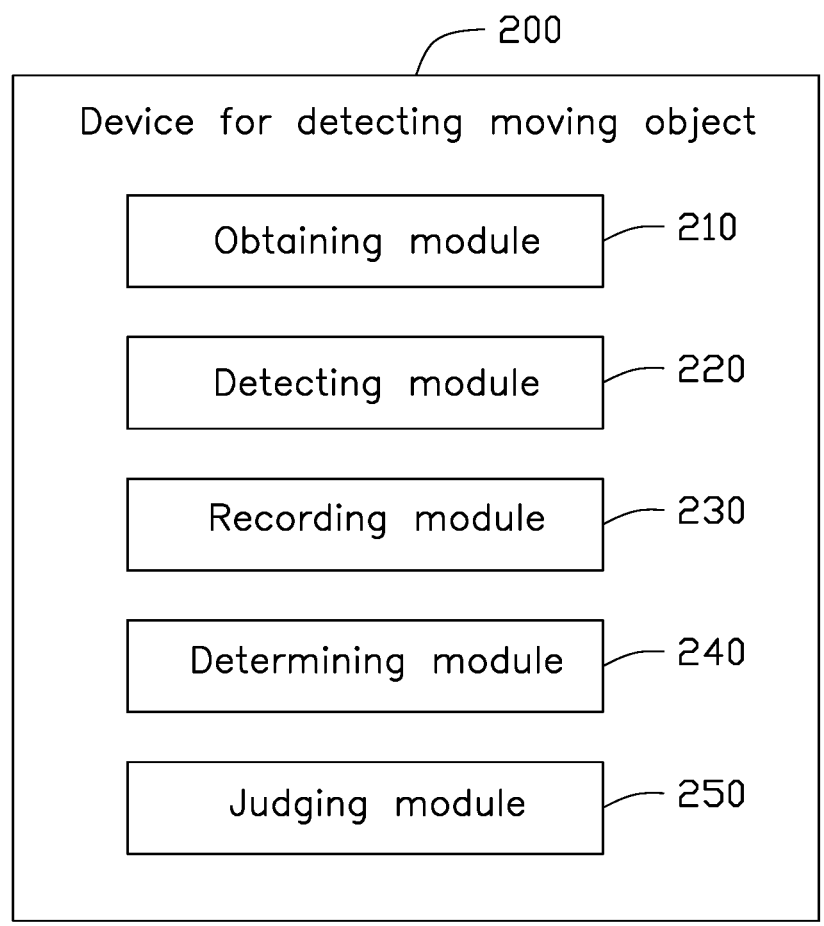
FIG. 2 is a block diagram of an embodiment of a device of detecting moving objects.

Referring to FIG. 2, a device of detecting moving objects is shown. The device of detecting moving objects 200 can include an obtaining module 210, a detecting module 220, a recording module 230, a determining module 240, and a judging module 250.

In one embodiment, the above modules may be programmable software instructions stored in the storage unit, callable by the processor for execution. It can be understood that, in other embodiments, the above modules may also be program instructions or firmware fixed in the processor.

The obtaining module 210 is configured to obtain a point cloud data set of a target scene and an image of the target scene.

The detecting module 220 is configured to detect one or more stationary object areas from the image.

The recording module 230 is configured to record the point cloud data, which corresponds to the stationary object areas in the point cloud data set, to be first point cloud data.

The determining module 240 is configured to determine a velocity range of the first point cloud data according to the first point cloud data.

The judging module 250 is configured to determine whether one or more moving objects are present in the target scene according to second point cloud data and the velocity range of the first point cloud data, wherein the second point cloud data is the point cloud data of the point cloud data set excluding the first point cloud data.

Figure 3:
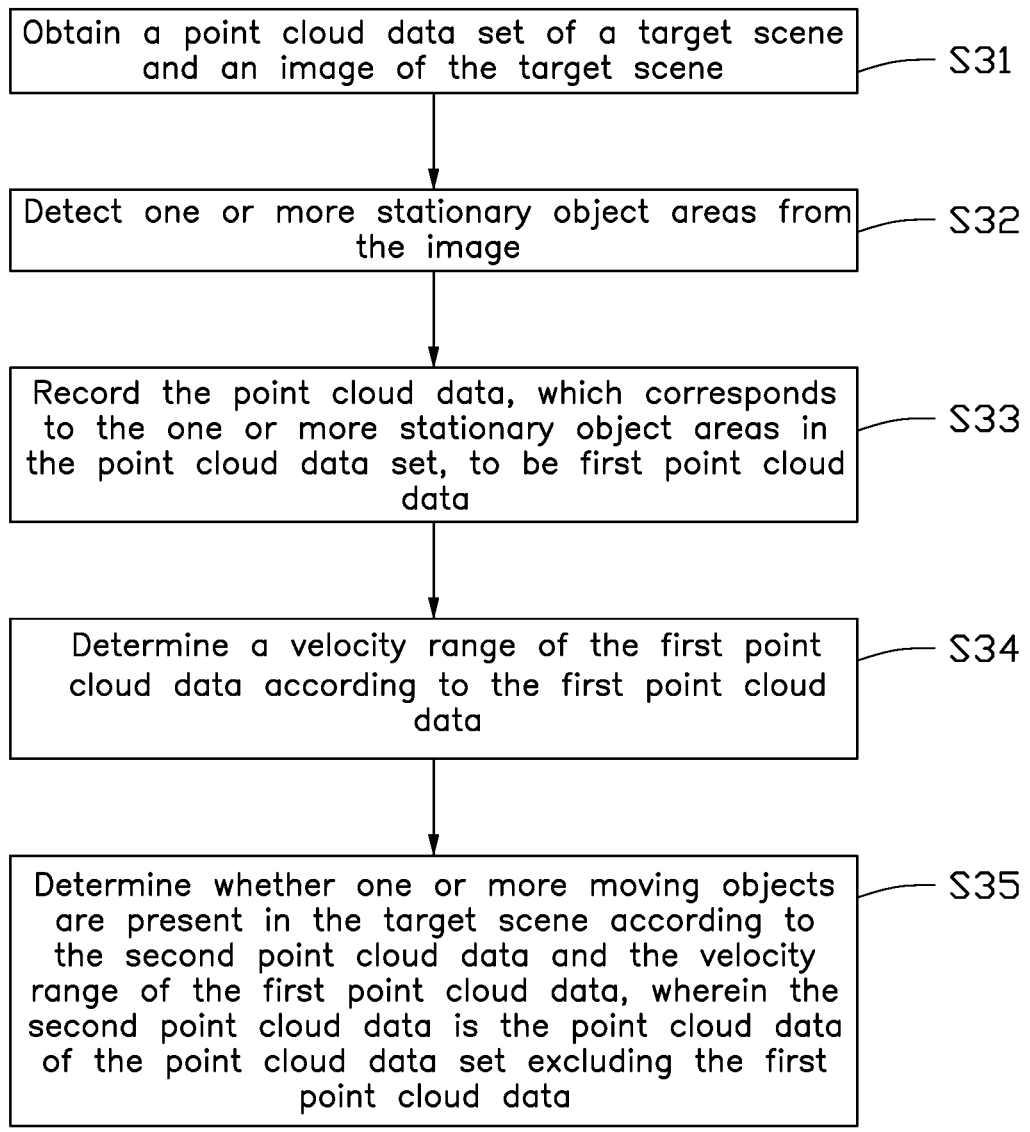
FIG. 3 is a flowchart of an embodiment of a method of detecting moving objects.

Referring to FIG. 3, a method of detecting moving objects is shown. The method of detecting moving objects can be applied on the electronic device of the FIG. 1, and can be executed by the processor of the FIG. 1. According to different requirements, the order of the steps in the flowchart can be changed, and fewer steps can be utilized. A detail can be described as follows:

Step S31, obtaining a point cloud data set of a target scene and an image of the target scene.

In the embodiment, the step S31 in detail includes a step a1 and a step a2. The step a1 includes obtaining the point cloud data set of the target scene via a radar. The step a2 includes obtaining the image of the target scene via an imaging device. In the embodiment, a processor can obtain the point cloud data set from the radar and the image from the imaging device.

The obtained point cloud data set and the obtained image in the step S31 can be the data collected by the radar and captured by the imaging device at the same time. Namely, the radar collects the point cloud data set of the target scene and the imaging device captures the image of the target scene simultaneously.

For example, the vehicle can be used as an example to illustrate the electronic device, and a front region of the vehicle can be used as an example to illustrate an installed position of the laser and the imaging device. During a travel of the vehicle, the imaging device can capture an image of the target scene ahead of the vehicle to capture the image, and record the time when the image is captured to obtain a timestamp of the image. The laser can scan the target scene ahead of the vehicle to collect the point cloud data, and record the time when the point cloud data is collected to obtain a timestamp of the point cloud data. The point cloud data whose timestamp are the same can be collected to collect the point cloud data set and the timestamp of the point cloud data set. After the image and the point cloud data set are obtained, the image and the point cloud data set whose timestamps are the same can be filtered according to the timestamps. The image and the point cloud data set whose timestamps are the same can be used for a processing of steps S32-S35.

Step S32, detecting one or more stationary object areas from the image.

In the embodiment, a classification network is stored in the electronic device. The classification network can be a neural network trained in advance. The classification network can be configured to detect the one or more objects in the image, for example detect one or more persons, one or more vehicles, one or more traffic signal lights, one or more buildings, a road, a ground, a distributed island, and so on. Where the classification network is a conventional mature technology, which is not described herein.

In the embodiment, each stationary object area is the area where the stationary object is in the image. The stationary object can be a traffic signal light, a building, a road, a ground, or the like.

In the embodiment, a stationary object to be a reference can be determined in advance. For example, based on the vehicle being used as an example to illustrate the electronic device, the ground or the road can be selected to be a stationary object. The region where the stationary object to be reference is in the image can be detected, the region is the stationary object area. The ground can be used as an example to illustrate the stationary object, the stationary object area is the region where the ground is.

Step S33, recording the point cloud data, which corresponds to the one or more stationary object areas in the point cloud data set, to be first point cloud data.

Figure 4:
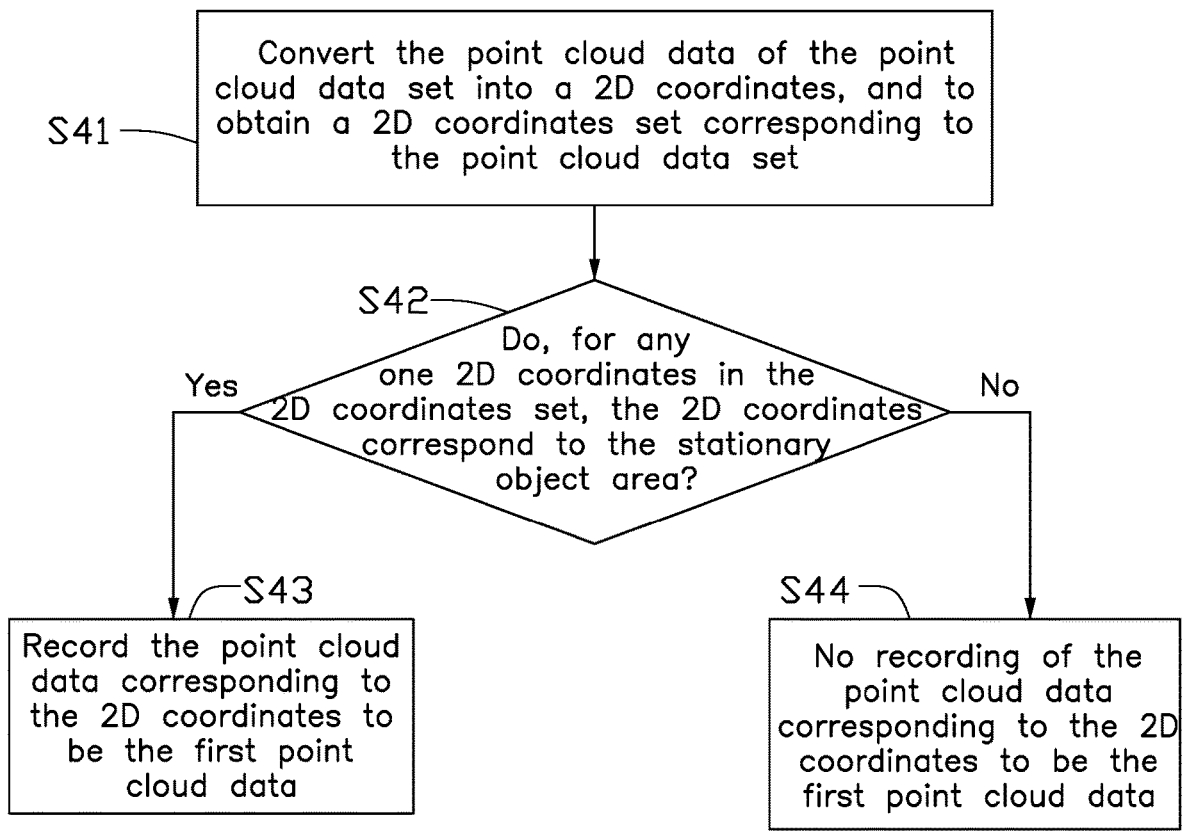
FIG. 4 is a flowchart of an embodiment describing a process for recording first point cloud data.

In some embodiments, referring to FIG. 4, the step S33 in detail includes:

Step S41, converting the point cloud data of the point cloud data set into a 2D coordinates, and to obtain a 2D coordinates set corresponding to the point cloud data set.

In the embodiment, the method obtains intrinsic parameters of the imaging device and extrinsic parameters between the imaging device and the radar in advanced, and converts the point cloud data set into the 2D coordinates set according to the intrinsic parameters and the extrinsic parameters. It can be understood that, obtaining the intrinsic parameters of the imaging device and the extrinsic parameters between the imaging device and the radar can be a conventional mature technology, which is not described herein.

The method converts the point cloud data set into the 2D coordinates set according to the intrinsic parameters and the extrinsic parameters can be, for example, converting the point cloud data into the 2D coordinates according to a following converting formula, and converting for each point cloud data, to obtain the 2D coordinates set. The converting formula can be:

$$Z_W \begin{bmatrix} u \\ v \\ 1 \end{bmatrix} = K \begin{bmatrix} R & T \\ 0 & 1 \end{bmatrix} \begin{bmatrix} x_w \\ y_w \\ z_w \\ 1 \end{bmatrix}$$

Where, $x_w$, $y_w$, $z_w$ is 3D coordinates of the point cloud data collected by the radar, K is the intrinsic parameters of the imaging device, $$\begin{bmatrix} R & T \\ 0 & 1 \end{bmatrix}$$

is the extrinsic parameters between the imaging device and the radar, u and v are the converted 2D coordinates.

It can be understood that, a method to convert the point cloud data set into the 2D coordinates set according to the intrinsic parameters and the extrinsic parameters can be different from aforementioned example, the disclosure is not limited herein.

Step S42, determining, for any one 2D coordinates in the 2D coordinates set, whether the 2D coordinates correspond to the stationary object area.

In the embodiment, each stationary object area in the image corresponds to one stationary object in the target scene. For example, the one or more stationary object areas are the ground areas, thus the one or more stationary object areas correspond to the ground in the target scene. The radar can scan each object in the target scene or different positions on a single object. For example, a point that a certain 2D coordinates corresponds to the target scene is a point A. The point A is a point a of an object A in the target scene. A point that another 2D coordinates corresponds to the target scene is a point B, the point B is a point b of an object B in the target scene. Thus, the method can determine, for any one 2D coordinates in the 2D coordinates set, whether the 2D coordinates corresponds to the corresponding stationary object area. Namely, the method determines whether the one or more objects in the target scene corresponding to the 2D coordinates are the one or more stationary objects indicated by the one or more stationary object areas. Or, namely, the method determines whether the spatial points in the target scene corresponding to the 2D coordinates are within a spatial area range where the one or more stationary objects in the target scene are.

Figure 5:
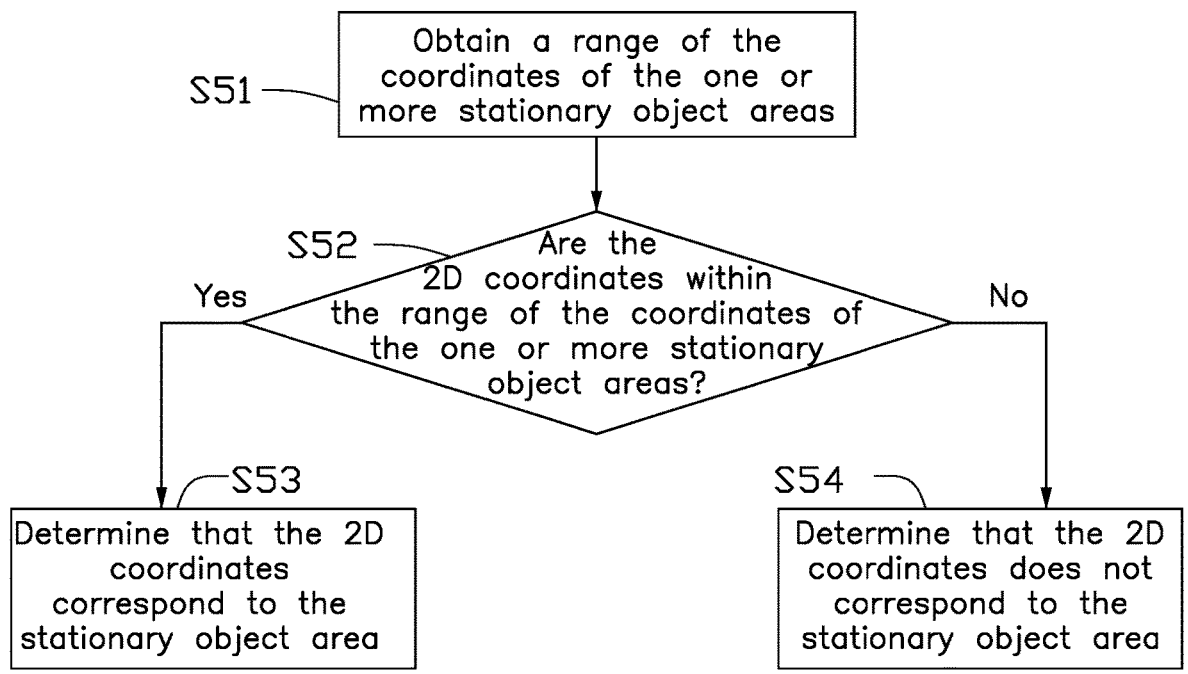
FIG. 5 is a flowchart of an embodiment describing a process for determining whether the 2D coordinates correspond to a stationary object area.

In some embodiments, referring to FIG. 5, the step S42 in detail includes:

Step S51: obtaining a range of the coordinates of the one or more stationary object areas.

Step S52: determining whether the 2D coordinates are within the range of the coordinates of the one or more stationary object areas. If the 2D coordinates are within the range of the coordinates of the one or more stationary object areas, the procedure goes to a step S53. If the 2D coordinates are out of the range of the coordinates of the one or more stationary object areas, the procedure goes to a step S54.

Step S53: determining that the 2D coordinates correspond to the stationary object area.

Step S54: determining that the 2D coordinates does not correspond to the stationary object area.

Obviously, the method can determine, for any one 2D coordinates in the 2D coordinates set, whether the 2D coordinates are within the range of the coordinates of the one or more stationary object areas. If, for any one 2D coordinates in the 2D coordinates set, the 2D coordinates are within the range of the coordinates of the one or more stationary object areas, namely if any one of the 2D coordinates in the 2D coordinates set is determined to be within the range of the coordinates of the one or more stationary object areas, the method determines that any one 2D coordinates in the 2D coordinates set corresponds to the stationary object area. If, for any one 2D coordinates in the 2D coordinates set, the 2D coordinates are not within the range of the coordinates of the one or more stationary object areas, namely if any one of the 2D coordinates in the 2D coordinates set is not determined to be within the range of the coordinates of the one or more stationary object areas, the method determines that any one 2D coordinates in the 2D coordinates set does not correspond to the stationary object area.

It should be understood that, the 2D coordinates in the 2D coordinates set can correspond to a pixel point of the image. If the radar can scan the point a of the object A in the target scene, the method can obtain the point cloud data of the point a, and convert the point cloud data of the point a into 2D coordinates (x, y). Corresponding pixel coordinates (x1, y1) of the point a of the object A in the target scene can be found in the image. The 2D coordinates (x, y) can be the same as the pixel coordinate (x1, y1) in the image, or the 2D coordinate (x, y) can be different from the pixel coordinates (x1, y1) in the image. If the 2D coordinates (x, y) is different from the pixel coordinates (x1, y1), the method can determine a relationship between the 2D coordinates and the pixel point of the image according to the intrinsic parameters of the imaging device and the extrinsic parameters between the imaging device and the radar.

For example, a range of the coordinates ((0, 0), (3, 0), (3, 3), (0, 3)) can be taken as an example to illustrate the range of the coordinates of the one or more stationary object areas. If the 2D coordinates (x, y) is the same as the pixel coordinates (x1, y1) of the image, namely, for the point a of the object A in the target scene, the 2D coordinates converted from the point cloud data of the point a is (3, 0), the pixel coordinates of the point a in the image is (3, 0), and the 2D coordinates (3, 0) of the point cloud data is determined to be within the range of the coordinates of the one or more stationary object areas ((0, 0), (3, 0), (3, 3), (0, 3)), thus the 2D coordinates corresponds to the one or more stationary object areas. If the 2D coordinate (x, y) is different from the pixel coordinates (x1, y1) of the image, whether the 2D coordinates are within the range of the coordinates of the one or more stationary object areas can be determined according to the relationship between the 2D coordinates and the pixel point of the image.

If, for any one 2D coordinates in the 2D coordinates set, the 2D coordinates corresponds to the stationary object area, namely if any one of the 2D coordinates in the 2D coordinates set is determined to correspond to the one of the stationary object areas, the procedure goes to a step S43. If, for any one 2D coordinates in the 2D coordinates set, the 2D coordinates do not correspond to the stationary object area, namely if any one of the 2D coordinates in the 2D coordinates set is not determined to correspond to the one of the stationary object areas, the procedure goes to a step S44.

Step S43: recording the point cloud data corresponding to the 2D coordinates to be the first point cloud data.

In the embodiment, via a comparing the point cloud data collected by the radar with the image, the point cloud data corresponding to the one or more stationary object areas can be filtered, namely, the scanned point cloud data of the one or more stationary objects can be filtered, and be recorded to be the first point cloud data.

Step S44: no recording of the point cloud data corresponding to the 2D coordinates to be the first point cloud data. In some embodiments, if the 2D coordinates is out of the range of the coordinates, the method can record the point cloud data corresponding to the 2D coordinates to be the second point cloud data.

Step S34: determining a velocity range of the first point cloud data according to the first point cloud data.

In the embodiment, the radar can scan the one or more objects in the target scene, and determine the velocity of each object according to the scanned point cloud data of the one or more objects. Namely, when the receiver receives the point cloud data of the RF waves reflected off the one or more objects in the target scene, the point cloud data can carry the velocity of each of the one or more objects which reflect the RF waves.

In the embodiment, the first point cloud data can include one or more point cloud data. For example, the RF waves transmitted by the transmitter can scan the ground to form one hundred points, the receiver can receive the RF waves reflected by the one hundred points, to form the one hundred point cloud data. The one hundred point cloud data is the first point cloud data. A minimum value of the velocity among the velocities of the one hundred point cloud data is 5.5 km/h, and a maximum value of the velocity among the velocities of the one hundred point cloud data is 5.7 km/h, thus the velocity range of the first point cloud data is from 5.5 km/h to 5.7 km/h.

Step S35, determining whether one or more moving objects are present in the target scene according to the second point cloud data and the velocity range of the first point cloud data, wherein the second point cloud data is the point cloud data of the point cloud data set excluding the first point cloud data.

Figure 6:
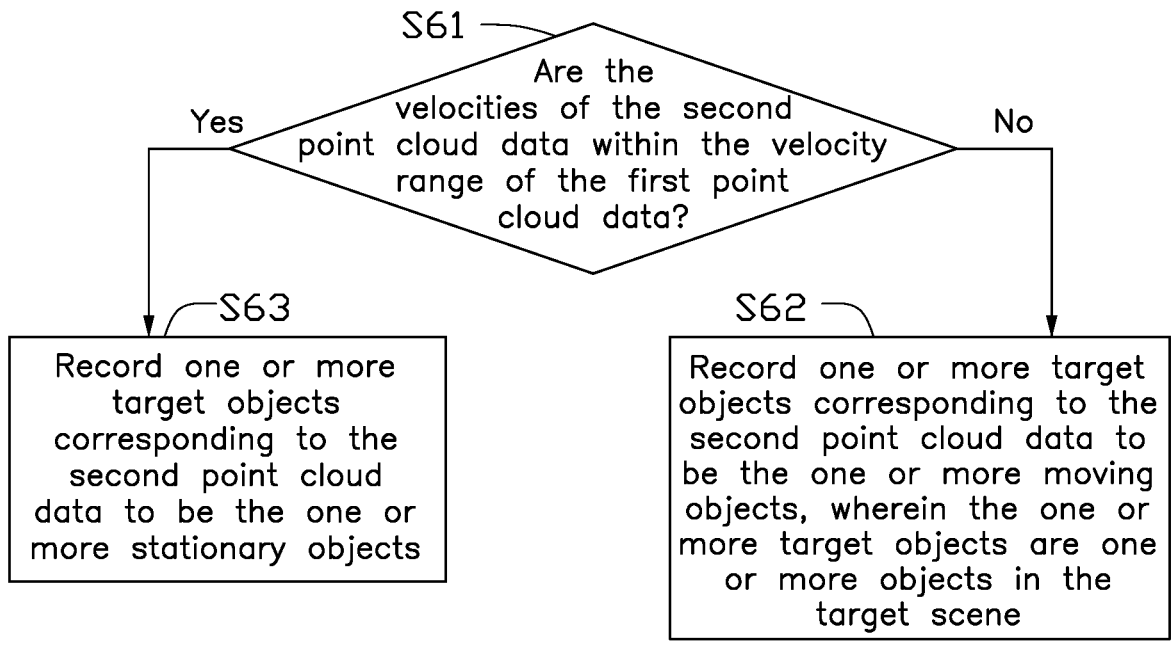
FIG. 6 is a flowchart of an embodiment describing a process for determining whether one or more moving objects present.

In some embodiments, referring to FIG. 6, the step S35 in detail includes:

Step S61, determining whether the velocities of the second point cloud data are within the velocity range of the first point cloud data. If the velocities of the second point cloud data are out of the velocity range of the first point cloud data, the procedure goes to a step S62. If the velocities of the second point cloud data are within the velocity range of the first point cloud data, the procedure goes to a step S63.

Step S62: recording one or more target objects corresponding to the second point cloud data to be the one or more moving objects, wherein the one or more target objects are one or more objects in the target scene.

Step S63, recording one or more target objects corresponding to the second point cloud data to be the one or more stationary objects.

In the embodiment, if the velocities of the second point cloud data are within the velocity range of the first point cloud data, the one or more target objects in the target scene corresponding to the second point cloud data are stationary relative to the one or more stationary objects. If the velocities of the second point cloud data are out of the velocity range of the first point cloud data, the one or more target objects in the target scene corresponding to the second point cloud data are moving relative to the one or more stationary objects. Based on the ground being used as an example to illustrate the one or more stationary objects, if the one or more target objects are stationary relative to the ground, the one or more target objects can be the one or more stationary objects. If the one or more target objects are moving relative to the ground, the one or more target objects can be the one or more moving objects.

In some embodiments, the method further includes a step b1 and a step b2. The step b1 includes determining one or more target pixels of the image according to the 2D coordinates corresponding to the second point cloud data if the velocities of the second point cloud data are out of the velocity range of the first point cloud data. The step b2 includes determining one or more areas where the one or more target pixels are to be one or more moving object areas.

In detail, the method can determine whether the one or more objects scanned by the radar are the one or more moving objects according to the velocities carried by the point cloud data. Namely, the method can determine whether the velocities of the second point cloud data are within the velocity range of the first point cloud data. If the velocities of the second point cloud data are out of the velocity range of the first point cloud data, the method can determine the one or more target objects in the target scene corresponding to the second point cloud data are the one or more moving objects. The method can further mark the one or more moving object areas in the image according to the 2D coordinates corresponding to the second point cloud data.

In the embodiment, the disclosure can obtain the point cloud data set of the target scene and the image of the target scene which are collected and captured at the same time. The disclosure can detect one or more stationary object areas where the one or more stationary objects are and from the image via detecting the image. The method can determine the point cloud data of the one or more stationary object areas from the point cloud data set, namely determine the point cloud data of the one or more stationary objects from the point cloud data set. The method further records the point cloud data to be the first point cloud data. The method can determine the velocity range according to the velocities of the first point cloud data, thus the velocity range of the one or more stationary objects can be obtained. Thus, the method can determine a relationship between the velocities of the second point cloud data excluding the first point cloud data and the velocity range, namely determine a relationship between the one or more target objects corresponding to the second point cloud data and the one or more stationary objects. If the velocities of the second point cloud data are within the velocity range of the first point cloud data, the one or more target objects corresponding to the second point cloud data are stationary relative to the one or more stationary objects. If the velocities of the second point cloud data are out of the velocity range of the first point cloud data, the one or more target objects corresponding to the second point cloud data are moving relative to the stationary object. The ground is selected to be the one or more stationary objects, thus the one or more target objects which are moving relative to the ground are the one or more moving objects.

The embodiment of the present disclosure further provides a computer storage medium where computer executable instructions are stored herein, the computer executable instructions are used for executing the method of detecting moving objects.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other modules or steps, and singularity does not exclude plurality. A plurality of units or modules stated in a system claim may also be implemented by a single unit or module through software or hardware. Terms such as the first and the second are used to indicate names, but do not indicate any particular sequence.

The embodiments described above are provided by way of example only, and various other modifications will be apparent to persons skilled in the field without departing from the scope of the invention as defined by the appended claims. It will be appreciated that, numerous variations and substitutions will occur to those skilled in the art without departing from the scope of the disclosure. Those variations and substitutions made in accordance with the spirit of the disclosure are within the scope of the present disclosure.

Finally, it should be noted that the above embodiments are used to describe the technical solutions of the present disclosure without imposing any limitation thereon. Although the present disclosure is described in detail by referring to the exemplary embodiments, persons of ordinary skill in the art should understand that modifications or equivalent replacements can be made to the technical solutions of the present disclosure without departing from the spirit and scope of the technical solutions of the present disclosure.

What is claimed is:

1. A method of detecting moving objects comprising:
   obtaining a point cloud data set of a target scene and an image of the target scene;
   detecting one or more stationary object areas from the image;
   recording point cloud data, which corresponds to the stationary object areas in the point cloud data set, to be first point cloud data;
   determining a velocity range of the first point cloud data according to the first point cloud data; and
   determining whether one or more moving objects are present in the target scene according to second point cloud data and the velocity range of the first point cloud data, wherein the second point cloud data is the point cloud data of the point cloud data set excluding the first point cloud data.

2. The method according to claim 1, wherein the recording the point cloud data corresponding to the stationary object areas in the point cloud data set to be first point cloud data comprises:
   converting the point cloud data of the point cloud data set into two-dimensional coordinates, and to obtain a two-dimensional coordinates set corresponding to the point cloud data set;
   determining, for any one of the two-dimensional coordinates in the two-dimensional coordinates set, whether the two-dimensional coordinates correspond to one of the stationary object areas;
   if any one of the two-dimensional coordinates in the two-dimensional coordinates set is determined to correspond to the one of the stationary object areas, recording the point cloud data corresponding to the two-dimensional coordinates to be the first point cloud data.

3. The method according to claim 2, wherein the determining, for any one of the two-dimensional coordinates in the two-dimensional coordinates set, whether the two-dimensional coordinates corresponds to one of the stationary object areas comprises:

obtaining a range of coordinates of the one or more stationary object areas, wherein the one or more stationary object areas are one or more areas where a ground is;

determining, for any one of the two-dimensional coordinates in the two-dimensional coordinates set, whether the two-dimensional coordinates are within the range of the coordinates of the one or more stationary object areas;

determining that the two-dimensional coordinates correspond to the one or more stationary object areas if the two-dimensional coordinates are within the range of the coordinates of the one or more stationary object areas.

4. The method according to claim 3, wherein the determining the velocity range of the first point cloud data according to the first point cloud data comprises:

obtaining a velocity of each of the first point cloud data;

determining the velocity range of the first point cloud data according to the velocity of each of the first point cloud data.

5. The method according to claim 1, wherein the determining whether one or more moving objects are existed in the target scene according to the second point cloud data and the velocity range of the first point cloud data comprises:

determining whether velocities of the second point cloud data are within the velocity range of the first point cloud data;

recording one or more target objects corresponding to the second point cloud data to be the one or more moving objects if the velocities of the second point cloud data are out the velocity range of the first point cloud data, wherein the one or more target objects are one or more objects in the target scene.

6. The method according to claim 5, wherein the method further comprises:

determining one or more target pixels of the image according to two-dimensional coordinates corresponding to the second point cloud data, if the velocities of the second point cloud data are out of the velocity range of the first point cloud data;

determining one or more areas where the one or more target pixels are to be one or more moving object areas.

7. The method according to claim 1, wherein the obtaining the point cloud data set of the target scene and the image of the target scene comprises:

obtaining the point cloud data set of the target scene via a radar, the radar collecting the point cloud data set of the target scene;

obtaining the image of the target scene via an imaging device, the imaging device capturing the image of the target scene; wherein the imaging device captures the image of the target scene and the radar collects the point cloud data set of the target scene simultaneously.

8. An electronic device comprising:

a storage device;

at least one processor; and the storage device storing one or more programs, which when executed by the at least one processor, cause the at least one processor to:

obtain a point cloud data set of a target scene and an image of the target scene;

detect one or more stationary object areas from the image;

record point cloud data, which corresponds to the stationary object areas in the point cloud data set, to be first point cloud data;

determine a velocity range of the first point cloud data according to the first point cloud data; and determine whether one or more moving objects are present in the target scene according to second point cloud data and the velocity range of the first point cloud data, wherein the second point cloud data is the point cloud data of the point cloud data set excluding the first point cloud data.

9. The electronic device according to claim 8, further causing the at least one processor to:

convert the point cloud data of the point cloud data set into two-dimensional coordinates, and to obtain a two-dimensional coordinates set corresponding to the point cloud data set;

determine, for any one of the two-dimensional coordinates in the two-dimensional coordinates set, whether the two-dimensional coordinates correspond to one of the stationary object areas;

if any one of the two-dimensional coordinates in the two-dimensional coordinates set is determined to correspond to the one of the stationary object areas, record the point cloud data corresponding to the two-dimensional coordinates to be the first point cloud data.

10. The electronic device according to claim 9, further causing the at least one processor to:

obtain a range of coordinates of the one or more stationary object areas, wherein the one or more stationary object areas are one or more areas where a ground is;

determine, for any one of the two-dimensional coordinates in the two-dimensional coordinates set, whether the two-dimensional coordinates are within the range of the coordinates of the one or more stationary object areas;

determine that the two-dimensional coordinates correspond to the one or more stationary object areas if the two-dimensional coordinates are within the range of the coordinates of the one or more stationary object areas.

11. The electronic device according to claim 10, further causing the at least one processor to:

obtain a velocity of each of the first point cloud data;

determine the velocity range of the first point cloud data according to the velocity of each of the first point cloud data.

12. The electronic device according to claim 8, further causing the at least one processor to:

determine whether velocities of the second point cloud data are within the velocity range of the first point cloud data;

record one or more target objects corresponding to the second point cloud data to be the one or more moving objects if the velocities of the second point cloud data are out the velocity range of the first point cloud data, wherein the one or more target objects are one or more objects in the target scene.

13. The electronic device according to claim 12, further causing the at least one processor to:

determine one or more target pixels of the image according to two-dimensional coordinates corresponding to the second point cloud data, if the velocities of the second point cloud data are out of the velocity range of the first point cloud data;

determine one or more areas where the one or more target pixels are to be one or more moving object areas.

14. The electronic device according to claim 8, further causing the at least one processor to:

obtain the point cloud data set of the target scene via a radar, the radar collecting the point cloud data set of the target scene;

obtain the image of the target scene via an imaging device, the imaging device capturing the image of the target scene; wherein the imaging device captures the image of the target scene and the radar collects the point cloud data set of the target scene simultaneously.

15. A non-transitory storage medium storing a set of commands, when the commands being executed by at least one processor of an electronic device, causing the at least one processor to:

obtain a point cloud data set of a target scene and an image of the target scene;

detect one or more stationary object areas from the image;

record point cloud data, which corresponds to the stationary object areas in the point cloud data set, to be first point cloud data;

determine a velocity range of the first point cloud data according to the first point cloud data; and determine whether one or more moving objects are present in the target scene according to second point cloud data and the velocity range of the first point cloud data, wherein the second point cloud data is the point cloud data of the point cloud data set excluding the first point cloud data.

16. The non-transitory storage medium according to claim 15, further causing the at least one processor to:

convert the point cloud data of the point cloud data set into two-dimensional coordinates, and to obtain a two-dimensional coordinates set corresponding to the point cloud data set;

determine, for any one of the two-dimensional coordinates in the two-dimensional coordinates set, whether the two-dimensional coordinates correspond to one of the stationary object areas;

if any one of the two-dimensional coordinates in the two-dimensional coordinates set is determined to correspond to the one of the stationary object areas, record the point cloud data corresponding to the two-dimensional coordinates to be the first point cloud data.

17. The non-transitory storage medium according to claim 16, further causing the at least one processor to:

obtain a range of coordinates of the one or more stationary object areas, wherein the one or more stationary object areas are one or more areas where a ground is;

determine, for any one of the two-dimensional coordinates in the two-dimensional coordinates set, whether the two-dimensional coordinates are within the range of the coordinates of the one or more stationary object areas;

determine that the two-dimensional coordinates correspond to the one or more stationary object areas if the two-dimensional coordinates are within the range of the coordinates of the one or more stationary object areas.

18. The non-transitory storage medium according to claim 17, further causing the at least one processor to:

obtain a velocity of each of the first point cloud data;

determine the velocity range of the first point cloud data according to the velocity of each of the first point cloud data.

19. The non-transitory storage medium according to claim 15, further causing the at least one processor to:

determine whether velocities of the second point cloud data are within the velocity range of the first point cloud data;

record one or more target objects corresponding to the second point cloud data to be the one or more moving objects if the velocities of the second point cloud data are out the velocity range of the first point cloud data, wherein the one or more target objects are one or more objects in the target scene.

20. The non-transitory storage medium according to claim 19, further causing the at least one processor to:

determine one or more target pixels of the image according to two-dimensional coordinates corresponding to the second point cloud data, if the velocities of the second point cloud data are out of the velocity range of the first point cloud data;

determine one or more areas where the one or more target pixels are to be one or more moving object areas.

* * * * *